Jan. 8, 1924.　　　　　　　　　　　　　　　　1,480,511
H. COLOMB
TIMEPIECE
Original Filed May 13, 1921
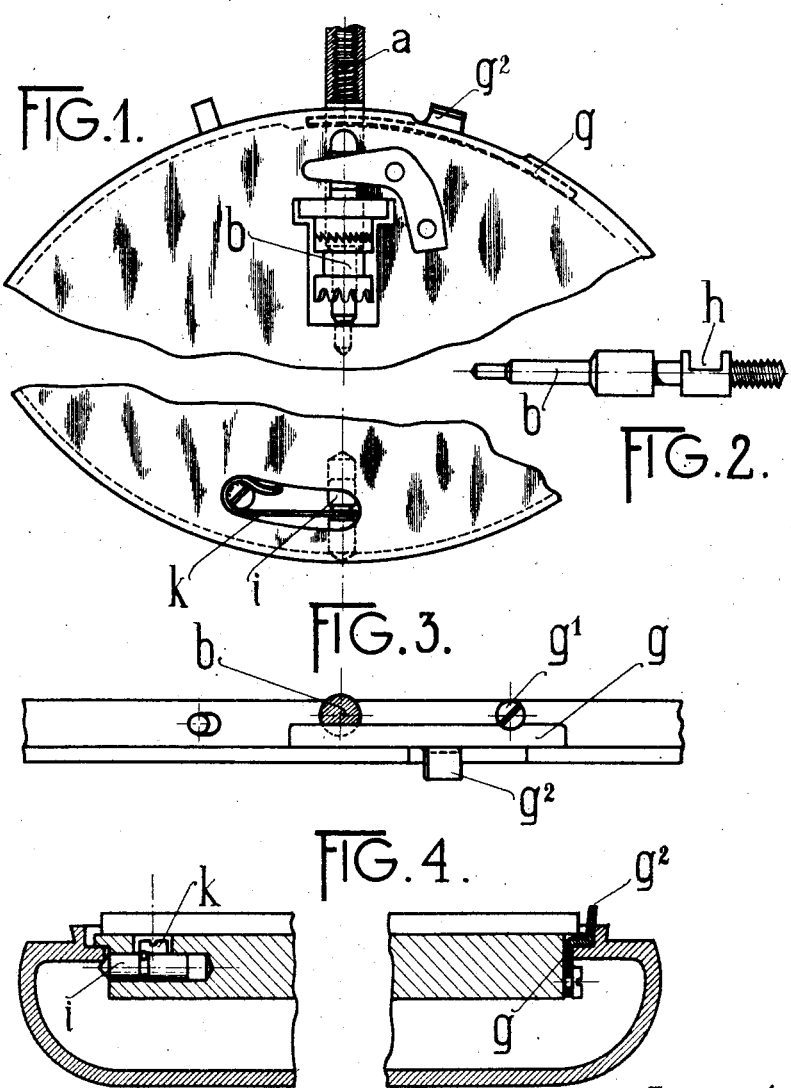

Patented Jan. 8, 1924.

1,480,511

UNITED STATES PATENT OFFICE.

HENRI COLOMB, OF TAVANNES, SWITZERLAND.

TIMEPIECE.

Original application filed May 13, 1921, Serial No. 469,311. Divided and this application filed September 12, 1922. Serial No. 587,782.

*To all whom it may concern:*

Be it known that I, HENRI COLOMB, a citizen of the Confederation of Switzerland, residing at Tavannes, Switzerland, have invented certain new and useful Improvements in Timepieces, of which the following is a specification.

This application is a division of my application No. 469,311 filed May 13th, 1921, patented December 12, 1922, No. 1,438,427.

The present invention relates to a time piece provided with a stem of two pieces, both parts of said stem being coupled and uncoupled by a relative rotative movement, one of said parts being, for this purpose locked.

In the remontoir-mechanism and hand setting known as "positive," the stem on which the crown is fitted, is of one piece and is directly coupled to a lever known as a "draw-piece" or "bolt" which is set in action by means of the crown.

The draw-piece is kept in contact with the stem by means of a collet-screw adjusted between the bridge and the plate.

In order to fasten or to take off the stem when the movement is cased or taken out, it is necessary to act on the above-mentioned screw and this may be done from the movement side.

It is therefore comprehensible that movements provided with such remontoir-mechanisms with draw-piece cannot be used with cap-cases.

Some constructions have already been proposed in order to obviate said disadvantage, but in all constructions, the coupling and unlocking of the stem and of the draw-piece is done by means of a special mechanism acting upon said draw-piece, either vertically or parallel with regard to the movement.

In order to be used with a cap-case, the movement of a time piece according to the present invention wants no modifications, even if it is provided with other constructions already proposed and above mentioned.

This result is obtained by means of a stem of two pieces which are rigidly coupled one with the other, preferably by screwing or by means of a bayonet-joint.

Both sorts of coupling could be done only when the winding up is finished, but the spring and eventually the stop-work suffer thereby; the uncoupling could however not take place. The time piece according to the invention has therefore been provided with means for locking the part of the stem connected with the movement, this in order to obtain the coupling and especially the uncoupling of the outer part of the stem going through the pendant with the part connected with the movement.

In certain cases, the outer part of the stem may be omitted; i. e. in the bracelet-watches the crown will be screwed on the inner part of the stem.

The movement of a watch according to the present invention may be cased in cap-cases, even if it is provided with a push-hand-setting or if the stem is coupled with the movement by means of a bridle, the screw of which is accessible only from the movement side.

One time-piece provided with a stem according to the invention is represented in the annexed drawings, as explicative, but not restrictive example.

Fig. 1 is a fragmentary plan view of a movement with remontoir-mechanism and draw-piece hand setting, with my mechanism applied thereto.

Fig. 2 is a side view of the inner section of the improved stem.

Fig. 3 is an edge view of a portion of the mechanism shown in Fig. 1.

Fig. 4 is a diametrical sectional view showing the movement having my improvements, arranged in a portion of a case.

Parts $a$ and $b$ of the stem are coupled by screwing. The locking of the inner part connected with the movement is directly effected by means of the extremity of a slide-bar $g$ which catches in a notch $h$ of the stem. Part $b$ of the latter is more especially represented in Fig. 3. Said slide bar is forced into said notch in order to lock the part $b$ against rotation.

The slide-bar is provided with a finger-piece $g^2$ bent perpendicularly to the plane of the plate and a certain length of which projects from the latter; said slide-bar is curved so as to rub against the periphery of the plate, by means of a screw $g^1$.

It is to be considered here that the case in which the movement is placed, has neither a groove or notch to accommodate the slide-bar $g$, this being an advantage in manufacturing.

The assembling is effected by introducing, at the same time, the catch placed near the stem under the rim of the case and the upper extremity of part *b* of the stem in the pendant of the opening of the case provided for the same and by pressing on the movement on the side opposite to said parts till the shutting has passed under the case-band edge against which the plate leans.

The shutting is provided with a bolt *i* kept in place by a spring *k* embedded in a groove of the plate and engaging in a hollow of the bolt.

Instead of being coupled by screwing, the parts of the stem could also be coupled one to the other by means of a bayonet-joint.

I claim:

A time piece which is provided with a stem of two pieces, both parts of said stem being coupled and uncoupled by a rotative relative movement, one of said parts being locked in order to uncouple both parts, the locking of the lower part being effected by means of organs directly acting on said part, the latter being provided with a notch in which a locking device may be introduced, this locking device consisting in a push-piece fitted to the plate.

In testimony whereof, I affix my signature.

HENRI COLOMB.